(12) United States Patent
Sander et al.

(10) Patent No.: US 6,304,422 B1
(45) Date of Patent: Oct. 16, 2001

(54) POLARITY REVERSAL PROTECTION CIRCUIT

(75) Inventors: Rainald Sander; Chihao Xu; Josef-Matthias Gantioler, all of München (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/694,571

(22) Filed: Oct. 23, 2000

Related U.S. Application Data

(63) Continuation of application No. PCT/DE99/00882, filed on Mar. 24, 1999.

(30) Foreign Application Priority Data

Apr. 21, 1998 (DE) .............................................. 198 17 790

(51) Int. Cl.[7] ...................................................... H02H 3/18
(52) U.S. Cl. .............................................. 361/84; 307/127
(58) Field of Search ................................. 361/84, 18, 86; 307/127

(56) References Cited

U.S. PATENT DOCUMENTS 4,958,251 * 9/1990 Cini et al. ............................... 361/84
5,126,911 * 6/1992 Contiero et al. ........................ 361/84

* cited by examiner

*Primary Examiner*—Michael J. Sherry
(74) *Attorney, Agent, or Firm*—Herbert L. Lerner; Laurence A. Greenberg; Werner H. Stemer

(57) ABSTRACT

The polarity reversal protection circuit provides for a semiconductor switch (11) to be connected in parallel with the polarity reversal protection diode (10), which switch is switched off in the event of polarity reversal and is switched on during normal operation.

10 Claims, 2 Drawing Sheets

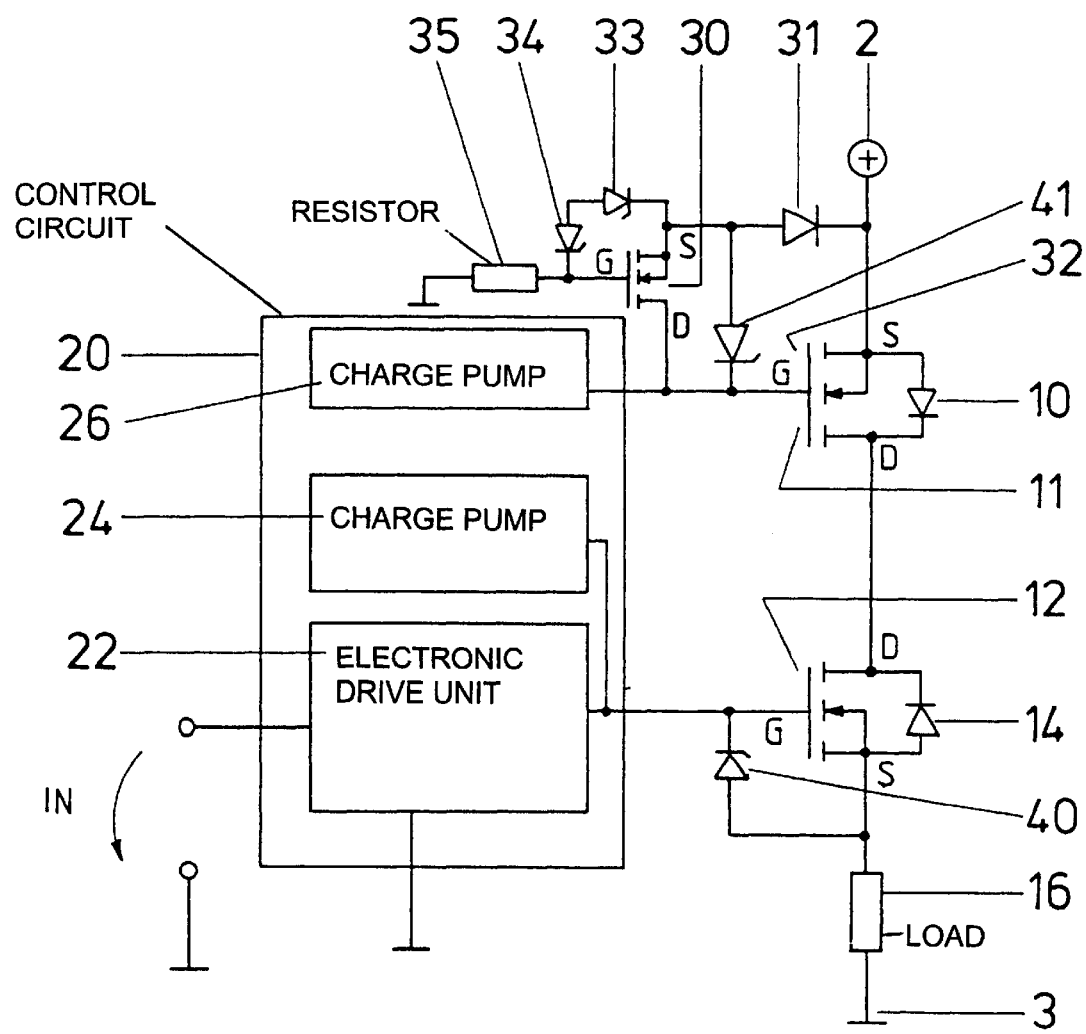

POLARITY REVERSAL PROTECTION CIRCUIT

CROSS-REFERENCE TO RELATED APPLICATION

This is a continuation of copending international application PCT/DE99/00882, filed Mar. 24, 1999, which designated the United States.

BACKGROUND OF THE INVENTION

FIELD OF THE INVENTION

The invention relates to a polarity reversal protection circuit that includes a first semiconductor switch and a polarity reversal protection diode that are connected in series with a load and that includes a second semiconductor switch that is connected in parallel with the polarity reversal protection diode. When the supply voltage terminals are properly connected to the circuit, the second semiconductor switch is switched on at least during the times that the first semiconductor switch is turned on.

The problem with power semiconductor switches and, in particular, MOS semiconductor switches by comparison with a relay is its diode, dictated by the technology, between the source connection and the drain connection of the MOS semiconductor switch. This diode, which is integrated in the MOS semiconductor switch and is also referred to as an inverse diode, is forward biased in the event of polarity reversal of the operation voltage and thus leads to the current flow through the load elements connected to the source connection or drain connection. In order in this case to afford effective protection of the load elements and of the MOS semiconductor switch against polarity reversal, it is regularly the case that a polarity reversal protection circuit is connected in series with the MOS semiconductor switch. In this case, the polarity reversal protection diode is biased such that during normal operation, that is to say correct connection of the supply voltage to the terminals of the circuit configuration, a current flow can take place through the polarity reversal protection diode. In contrast, the polarity reversal protection diode is in the off state in the event of polarity reversal, that is to say when the operational voltage is incorrectly connected to the terminals of the circuit configuration.

FIG. 1 illustrates a circuit configuration which is suitable for this purpose. The operating voltage V can be applied to two terminals 2, 3 in order to supply a load 16 with voltage, in a manner controlled by a semiconductor switch 12. By way of example, the load 16 may be the lamp of a motor vehicle headlight, which is switched on as required by the driver. In detail, the series circuit formed by the polarity reversal protection diode 10 already mentioned, the semiconductor switch 12 and the load 16 is present between the terminals 2 and 3. The anode connection of the polarity reversal protection diode 10 is connected to the terminal 2 and the cathode connection of the polarity reversal protection diode 10 is connected to the drain connection D of the semiconductor switch 12, which is designed as a MOS semiconductor switch in the present case. The source connection S is connected to one terminal of the load 16, the other terminal of which is connected to the terminal 3. An inverse diode 14 is connected in parallel with the load path of the semiconductor switch 12 and thus between the drain connection D and source connection S thereof. The anode connection of the inverse diode 14 is connected to the source connection S and the cathode connection is connected to the drain connection D. The semiconductor switch 12 is controlled at its control connection or gate connection G by a control device 20, which is known sufficiently to a person skilled in the art.

The circuit configuration illustrated in FIG. 1 shows a so called highside switch. Specifically, the semiconductor switch 12 is connected to the positive pole of the supply voltage terminal during normal operation by way of the polarity reversal protection diode 10. FIG. 1 illustrates normal operation, that is to say that the positive pole of the supply voltage V is connected to the terminal 2 and the negative pole to the terminal 3.

What is problematic with the circuit configuration illustrated in FIG. 1 is the power loss that is caused by the polarity reversal protection diode 10 and that is consumed continuously during normal operation because the current flow must necessarily flow through the forward biased polarity reversal protection diode 10. The power losses are extremely high primarily when the semiconductor switch 12 is intended to switch high currents. In this case, the voltage drop across the polarity reversal protection diode 10 is often unacceptably high, because this reduces the effective voltage across the load 16.

SUMMARY OF THE INVENTION

It is accordingly an object of the invention to improve the polarity reversal protection circuit illustrated in FIG. 1, and, in particular, of considerably reducing the power loss that inevitably occurs therein during normal operation.

With the foregoing and other objects in view there is provided, in accordance with the invention a polarity reversal protection circuit with a further controllable semiconductor switch connected in parallel with a polarity reversal protection diode, which switch is switched on by a control circuit during normal operation at least during the switched on times of the semiconductor switch. The further controllable semiconductor switch is switched off in the event of polarity reversal of the supply voltage.

This solution has the decisive advantage that during normal operation, that is to say with the supply voltage connected to the terminals in the correct manner, the polarity reversal protection diode 10 is bridged and so the power loss which occurs in the circuit configuration is one which is caused merely by the voltage drop of the switched on semiconductor switch. The power loss of the switched on further semiconductor switch is considerably smaller than the power loss caused by the polarity reversal protection diode.

In accordance with an added feature of the invention, the two semiconductor switches mentioned, that is to say the power semiconductor switch for switching on the current for the load and the semiconductor switch which is connected in parallel with the polarity reversal protection diode and can have smaller dimensions, are each realized by MOS transistors.

In accordance with an additional feature of the invention, the inverse diode that is present in any case in MOS semiconductor switches is expediently provided as the polarity reversal protection diode of the polarity reversal protection circuit.

In this case, the source connection of the further semiconductor switch is connected to that terminal of the supply voltage during normal operation at which a positive potential can be tapped off. The drain connection of the further semiconductor switch is connected to the drain connection of the power semiconductor switch and the source connection of the power semiconductor switch is connected via the load to the second terminal of the supply voltage, at which a negative potential or reference ground potential can be tapped off. The gate connection of the further semiconductor switch can be driven by means of the abovementioned control circuit in such a way that, during normal operation, the further semiconductor switch is always switched on or is in the on state at least when the power semiconductor switch is also in the on state. In contrast, in the event of polarity reversal, the further semiconductor switch is blocked and is thus switched off, with the result that the polarity reversal protection diode can fulfill its blocking function.

In accordance with another feature of the invention, the entire polarity reversal protection circuit may be designed as a monolithically integrated circuit configuration. However, the polarity reversal protection circuit according to the invention is not restricted to this, but rather, may also be constructed in discrete form or be integrated in a plurality of semiconductor chips. The two semiconductor switches of the polarity reversal protection circuit according to the invention may be integrated in different semiconductor bodies.

Other features which are considered as characteristic for the invention are set forth in the appended claims.

Although the invention is illustrated and described herein as embodied in a polarity reversal protection circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 shows a more detailed circuit diagram of the circuit configuration of FIG. 2.

DESCRIPTION OF THE PREFERRED EMBODIMENTS

In the figures below, unless otherwise indicated, identical reference symbols designate identical parts with the same meaning.

Figure 1:
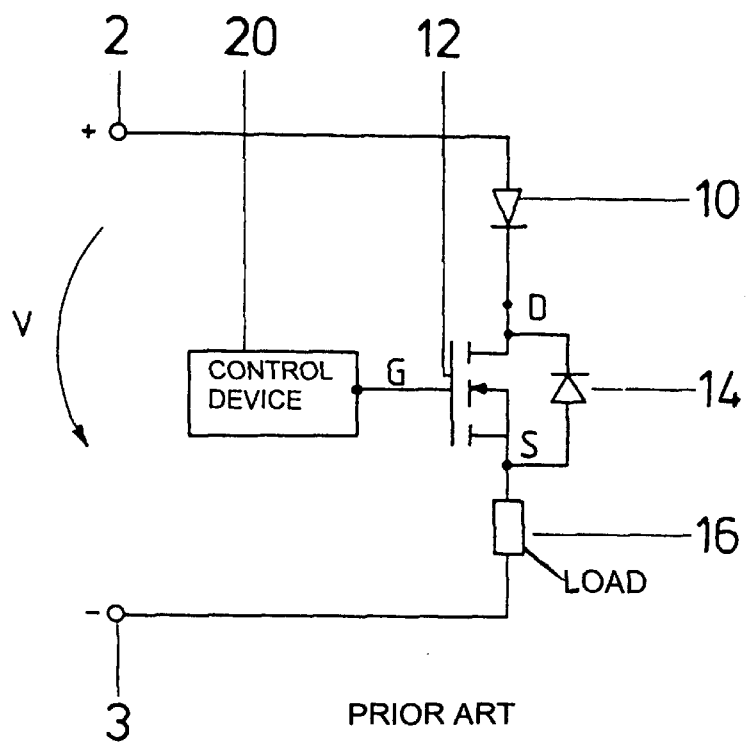
FIG. 1 shows a prior art polarity reversal protection circuit.
Figure 2:
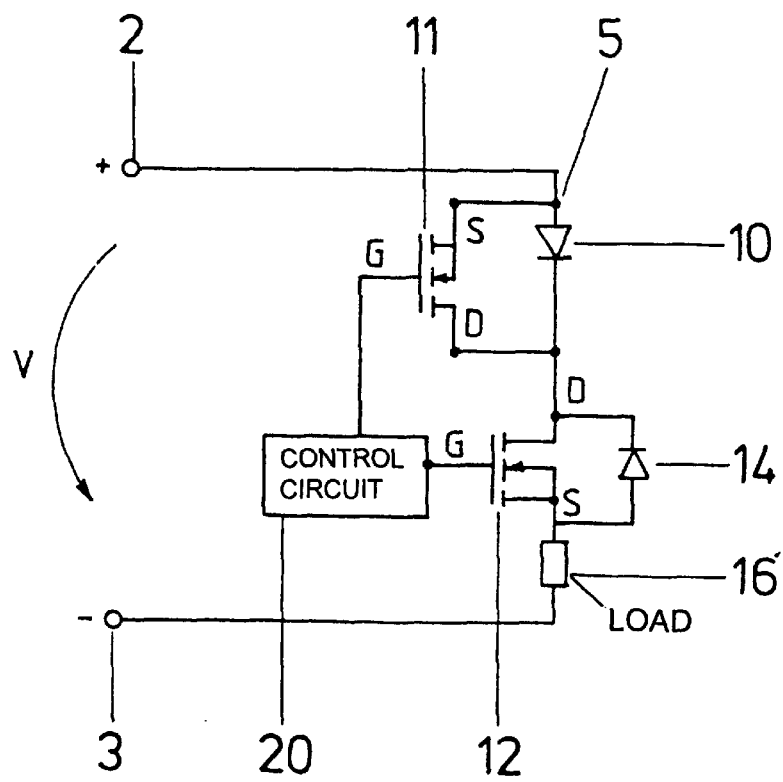
FIG. 2 shows a block diagram of an exemplary embodiment of an inventive polarity reversal protection circuit.

Referring now to the figures of the drawing in detail and first, particularly, to FIG. 2 thereof, there is shown a polarity reversal protection circuit that differs from the polarity reversal protection circuit illustrated in FIG. 1 in that the load path of a semiconductor switch, in this case a MOS FET 11, is connected in parallel with the polarity reversal protection diode 10. In detail, the source connection S is connected to the anode connection of the polarity reversal protection diode 10 and thus to the terminal 2 of the supply voltage V. The drain connection D is in contact with the cathode connection of the polarity reversal protection diode 10 and is thus likewise connected to the drain connection of the power MOS FET 12 of the circuit configuration. The control circuit 20 has a separate output which is in contact with the gate connection G of the MOS FET 11 and drives the latter in such a way that it is in the on state, that is to say it is switched on, during normal operation, that is to say with the supply voltage V connected to polarity reversal protection circuit in the correct manner. However, the control circuit 20 can also provide a control signal which switches on the MOS FET 11 precisely whenever the power MOS FET 12 also switches on. The consequence of such driving of the MOS FET 11 is that whenever current is actually supposed to flow through the load 16, the polarity reversal protection diode 10 is bridged by the MOS FET 11.

However, the control circuit 20 furthermore ensures that the MOS FET 11 is in the off state in the event of polarity reversal. FIG. 2 illustrates normal operation. This means that the positive pole of the supply voltage V is connected to the terminal 2 and the negative pole is connected to the terminal 3. In contrast, in the event of polarity reversal, the negative pole of the voltage terminal V would be connected to the terminal 2 and the positive pole to the terminal 3.

FIG. 3 illustrates the circuit configuration of FIG. 2 in more detail. The power MOS FET 12 is switched on and off in a manner known per se by the control circuit 20 according to a control signal IN. For this purpose, the control circuit 20 has an electronic drive unit 22, which conditions the input signal IN for application to the gate connection G of the power MOS FET 12. The control circuit 20 additionally contains a charge pump 24, which likewise acts on the gate connection G of the power MOS FET 12 and ensures that in the event of an input signal IN for switching on the power MOS FET 12, sufficient current is subsequently supplied to keep the power MOS FET 12 switched on. Such a charge pump 24 is likewise known per se. A zener diode 40 is connected between the gate connection G and source connection S of the power MOS FET 12. The anode connection of the zener diode 40 is connected to the source connection S and the cathode connection is connected to the gate connection G of the power MOS FET 12. The zener diode 40 protects the gate source junction of the power MOS FET 12.

The gate connection G of the further MOS FET 11 is likewise connected to a charge pump 26. In addition, the following circuit components are connected to the gate connection G of the MOS FET 11. The cathode connection of a further zener diode 41 is connected to the gate connection G of the MOS FET 11. The anode connection of the zener diode 41 is connected to the anode connection of a diode 31. The cathode connection of the diode 31 is connected to the terminal 2 of the polarity reversal protection circuit. The load path of a semiconductor switch, in this case a further MOS FET 30, is connected in parallel with the zener diode 41. The drain connection D of the MOS FET 30 is connected to the gate connection G of the MOS FET 11. The source connection S is in contact with the anode connections of the zener diode 41 and of the diode 31. The gate connection G of the MOS FET 30 is connected to reference ground potential via a resistor 35 and is thus connected to the terminal 3 of the polarity reversal protection circuit in the present case. Two further zener diodes 33, 34 are additionally provided, which diodes are reverse connected in series with one another. This means that the two anode connections of the zener diodes 33, 34 are connected to one another. The cathode connection of one zener diode 33 is in contact with the anode connections of the zener diode 41 and of the diode 31, while the cathode connection of the zener diode 34 is connected to the gate connection G of the MOS FET 30.

The polarity reversal protection diode 10 need not be realized as a separate diode, but rather may be the inverse diode which is present in any case in the MOS FET 11. The polarity reversal protection diode 10 is thus integrated in the semiconductor body of the MOS FET 11.

The circuit configuration illustrated in FIG. 3 operates as follows. The MOS FET 11, like the power MOS FET 12, is driven in each case via a charge pump 26 and 24, respectively, with the result that the MOS FET 11 bridges the polarity reversal protection diode 10 in a low impedance manner. The two on resistances of the MOS FET 11 and of the power MOS FET 12 thus determine the voltage loss across the load 16 during normal operation.

The zener diodes 40, 41 protect the gate connections G of the two MOS FETs 11, 12. The diode 31 prevents a current flow through the elements connected to the gate connection G of the MOS FET 11. This is necessary in order to prevent parasitic effects if the entire polarity reversal protection circuit is monolithically integrated in a common semiconductor body. The diode 31 can therefore also be omitted in the case of a dielectrically isolated embodiment.

In the event of polarity reversal of the supply voltage V, a current flow through the load 16 is prevented by the MOS FET 11 being turned off. This turn off is ensured by the MOS FET 30 in the event of polarity reversal, the MOS FET being switched on via the resistor 35 in the event of polarity reversal. Specifically, that connection of the resistor 35 which is connected to the terminal 3 is at positive potential in the event of polarity reversal, with the result that the MOS FET 30 can also switch on. The switched on MOS FET 30 short circuits the gate connection G of the MOS FET 11 with the source connection S thereof via the diode 31. As a result, the MOS FET 11 remains switched off or it is switched off at this instant when the polarity reversal takes place. The zener diodes 33, 34 protect the gate connection G of the MOS FET 30 against overvoltage.

In contrast, in the case of normal operation, the MOS FET 30 is switched off via the resistor 35, as a result of which the charge pump 26 in the control circuit 20 can charge the gate connection of the MOS FET 11 unhindered. The MOS FET 11 is therefore always switched on during normal operation.

The MOS FET 11 may be either an enhancement mode or a depletion mode MOS FET. The driving of the MOS FET 30 as illustrated in FIG. 3 need not necessarily be effected via the resistor 35 illustrated therein. Rather, the gate connection G of the MOS FET 30 can also be fed from internal control signals of the control circuit 20 in the manner mentioned.

When it was mentioned above that the entire polarity reversal protection circuit illustrated in FIG. 3 can be embodied as a monolithically integrated circuit, this does not mean, of course, that the invention is restricted to this. The polarity reversal protection circuit can also be integrated in a plurality of semiconductor bodies. By way of example, the two MOS FETs 11 and 12 may be accommodated in separate semiconductor bodies. Since the drain is the rear side of the two POWER MOSFETs, the two semiconductor bodies may be mounted on a metal support, e.g. the lead frame of a housing.

We claim:

1. A polarity reversal protection circuit, comprising:
   a series circuit including a load, a first semiconductor switch, and a polarity reversal protection diode connected in series between two terminals of a voltage supply;
   a second semiconductor switch connected in parallel with said polarity reversal protection diode, said second semiconductor switch having a control connection;
   a control device switching on said second semiconductor switch during normal operation, said control device switching on said second semiconductor switch at least during the switched on times of the first semiconductor switch; and
   an electronic switch-off device connected to said control connection of said second semiconductor switch and configured to turn off said second semiconductor switch.

2. The polarity reversal protection circuit according to claim 1, wherein said second semiconductor switch is a MOS FET with an inverse diode, and said polarity reversal protection diode is the inverse diode of the MOS FET.

3. The polarity reversal protection circuit according to claim 1, wherein said first semiconductor switch is a MOS FET.

4. The polarity reversal protection circuit according to claim 2, wherein said first semiconductor switch and said second semiconductor switch each have a source connection and a drain connection, said source connection of said second semiconductor switch connected to a first terminal of the two terminals of the supply voltage, said drain connection of said second semiconductor switch connected to said drain connection of said first semiconductor switch, said source connection of said first semiconductor switch connected via said load to a second terminal of the two terminals of the voltage supply.

5. The polarity reversal protection circuit according to claim 1, wherein said control device includes a charge pump for supplying said control connection of said second semiconductor switch, said switch-off device configured to switch off an action of said charge pump when the two terminals of the voltage supply are connected to said series circuit with a reversed polarity.

6. The polarity reversal protection circuit according to claim 5, comprising a resistor, said switch-off device including a third semiconductor switch having a load path that is connected between a first terminal of the two terminals of the supply voltage and said control connection of said second semiconductor switch, said third semiconductor switch having a control connection connected via said resistor to a second terminal of the two terminals of the supply voltage.

7. The polarity reversal protection circuit according to claim 6, comprising a diode having a cathode connection and an anode connection, said diode connected between the load path of the third semiconductor switch and the first terminal of the two terminals of the supply voltage such that said cathode connection is connected to the first terminal and the anode connection is connected to a terminal in the load path of the third semiconductor switch.

8. The polarity reversal protection circuit according to claim 6, comprising a zener diode connected in parallel with the load path of said third semiconductor switch.

9. The polarity reversal protection circuit according to claim 1, wherein said first semiconductor switch has a control connection and said series circuit includes a junction connection between said load and said first semiconductor switch, and comprising a zener diode connected between said control connection of said first semiconductor switch and said junction connection.

10. The polarity reversal protection circuit according to claim 1, comprising a semiconductor body in which said series circuit, said second semiconductor switch, said control device, and said electronic switch off device are monolithically integrated.

* * * * *